Nov. 29, 1960            S. LOEWE           2,962,238
ARRANGEMENT FOR AUTOMATICALLY CONTROLLING THE SPEED
OF SOUND CARRIERS IN MAGNETIC TAPE RECORDERS
Filed July 18, 1955                       3 Sheets-Sheet 1
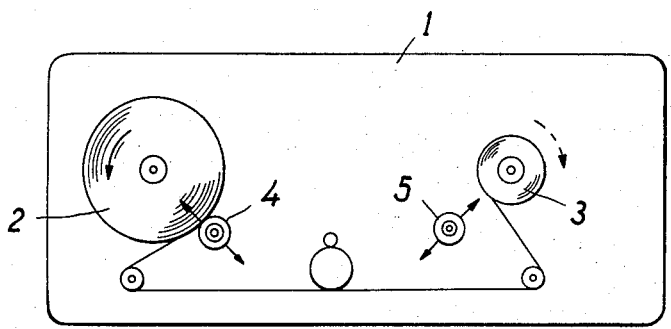
Fig. 1
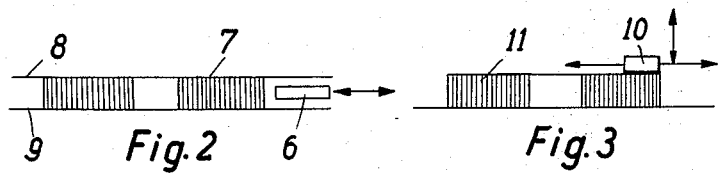
Fig. 2           Fig. 3
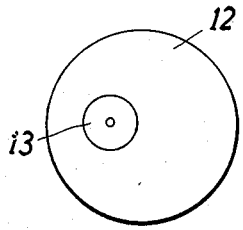 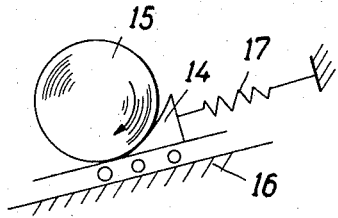
Fig. 4           Fig. 5
Inventor:
Siegmund Loewe ature of the United States Patent Office 2,962,238
Patented Nov. 29, 1960

2,962,238

ARRANGEMENT FOR AUTOMATICALLY CONTROLLING THE SPEED OF SOUND CARRIERS IN MAGNETIC TAPE RECORDERS

Siegmund Loewe, 68 Ridge Road, Yonkers 5, N.Y.

Filed July 18, 1955, Ser. No. 522,510

Claims priority, application Germany Aug. 3, 1954

8 Claims. (Cl. 242—55.12)

The invention refers to arrangements for automatically controlling the movement of the sound carriers in magnetic tape recorders. It is a special object of the invention to avoid disturbances and unnecessary strain of the sound carrier and further to enable a quick finding of definite parts of the recordings on a sound carrier.

The basic idea of the invention consists in that the magnitude of the external diameter of the sound carrier roll—altering during operation—releases a braking or switching effect and thereby controls the movement of the sound carrier. When carrying out the idea of this invention, the arrangement is so made that a braking device, preferably arranged radially to the sound carrier roll, effects a braking of the sound carrier to slower speed or to complete stop when a definite external diameter of the altering sound carrier roll is reached. This braking device is designed adjustable in such a way that the braking effect occurs at definite selectable diameters of the altering sound carrier roll. By way of example, the braking device is formed as a disc of felt, rubber or similar elastic material, by a friction roller or other suitably formed pressure surface, which works directly on the sound carrier roll. The braking pressure can be exerted on the peripheral outer surface of the sound carrier roll or on the narrow edges of the latter. In order to attain a soft braking of the sound carrier, it is of advantage to form the braking device so that, in the direction of the growing diameter of the sound carrier roll, it has a spring effect, whilst in the opposite direction it is radially adjustable but without spring effect. The avoidance of a spring effect in the opposite direction has the purpose of guaranteeing, with increasing external diameter, the most exact application of the braking effect possible.

The spring effect of the braking device can be realized in various ways. Thus it can have such a spring effect or be so yielding that the braking effect, in spite of the increasing external diameter of the sound carrier roll, remains constant or nearly constant. This type of braking device should be chosen when a soft, lasting and uniform braking is desired. It can be realised by using a long spring. On the other hand, by use of a short, hard spring, it is possible to cause a quick increase of the braking effect. In this case, with increasing external diameter of the sound carrier roll, a braking effect is attained which automatically and quickly becomes more forceful.

Further, the braking device can so be formed that the rotation of the sound carrier roll can be used to increase the braking effect. In this case, the rise of the braking effect with increasing external diameter of the sound carrier roll should be greater than that corresponding merely to the growing of the roll diameter. This can, by way of example, be effected in that, after the braking effect has begun, the braking shoe is taken along in the direction of rotation by means of the turning sound carrier roll and thereby is pressed with greater force on the roll, e.g. by inducing a wedge-effect with help of the rotation of the sound carrier roll.

In further details, the braking device is best formed according to the invention so that, with its movement, it actuates at the same time an electrical contact. This contact can serve to vary the speed of the drive or to bring it to a stop. This electrical contact can either become operative after a certain spring action of the braking device has been attained or when or before the braking becomes effective. In the latter case, the braking device accelerates the attainment of another desired state of movement of the sound carrier, e.g. to slow speed or stop.

The arrangement in accordance with the invention is further explained by means of the accompanying drawings which show schematically exemplary embodiments of the invention.

Fig. 1 is a schematic view showing the top of a tape recorder embodying the present invention;

Fig. 2 is a vertical sectional view of a tape winding spool and its associated brake device;

Fig. 3 is a vertical sectional view showing a modification of the tape spool and its associated braking device;

Fig. 4 is a top view of a modification of the braking device;

Figure 5 is a schematic view of another modification of the braking device;

Figure 6:
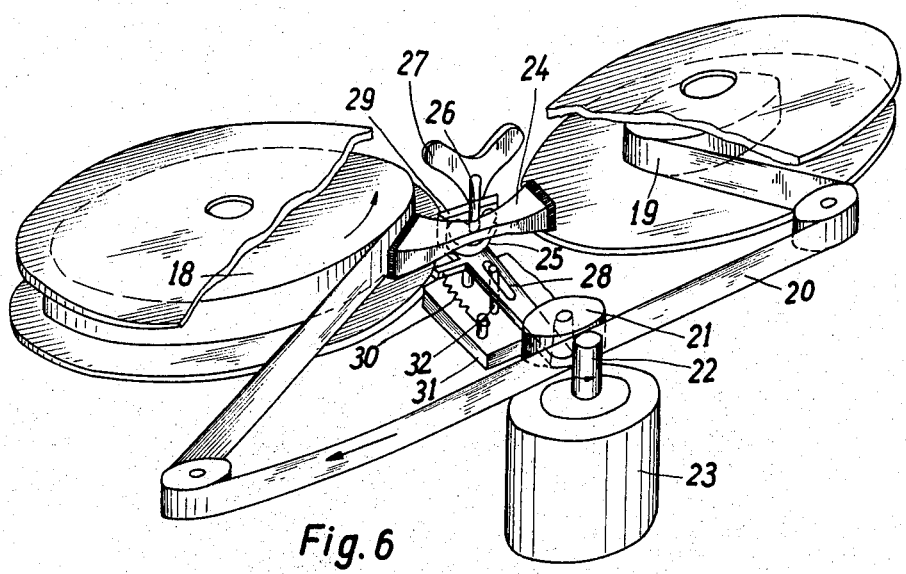
Fig. 6 is a perspective view of the tape driving and braking arrangement in accordance with the invention.

In Fig. 1, 1 is the plate of the set on which the two tape winding spools 2 and 3 are rotatably arranged. Further details of the drive of the sound carrier itself have been left out for the sake of simplicity. In the embodiment shown as an example, the two sound carrier rolls 2 and 3 turn, during winding up at high speed, alternately in the direction of the arrow. According to the invention, two braking devices 4 and 5 respectively, are provided, adjacent the winding spools periphery. These braking devices 4 and 5 are radially adjustable to the tape winding spools as shown by the arrows on the parts 4 and 5. The left sound carrier roll 2 is, in the present example, just being wound up, i.e. the external diameter of this roll 2 thus increases with rotation. As soon as this external diameter of the sound carrier roll has become so large that the braking device 4 comes into contact with the outer surface of the sound carrier, the braking effect occurs, as desired. Thus, by means of the device in accordance with the invention, it is possible to achieve a braking and thereby an influencing of the speed of the sound carrier results automatically with a definite diameter magnitude of the sound carrier roll, which is determined by the radial adjustment of the braking device 4 with respect to the pivot i.e. the centre of the sound carrier roll. Apart from this braking, the device can be so formed that a switching effect is released, by way of example, by actuation of an electrical contact which becomes effective when pressure is applied on the braking device or when the braking device 4 is shifted. For this purpose, the braking device is best arranged with a spring effect as already previously described. By means of the switching device, the drive motor can, by way of example, be switched off at the end of the sound carrier or at a selectable intermediate position of same. Thus, it is possible to attain accurately a stoppage of the sound carrier e.g. with high speed at the end of the sound carrier or also to stop the drive at previously adjustable points of the sound carrier. In the latter case, it is usually a question of finding definite places of the sound carrier, previously selected.

Likewise, with winding up of the right sound carrier roll 3, the other braking device 5 becomes operative. In this case, the roll 2 is wound off and the braking device 4 in accordance with the invention is out of operation.

In order to enable an easy adjustment of the braking device for the purpose of finding definite parts of the sound carrier, two scales are best provided for adjusting each braking device, one of which carries the adjusting details for one sound carrier roll, the other adjusting details for the other sound carrier spool. This is necessary since, in case of recorders with two winding spools, each spool is either reeled off or reeled up. These adjusting scales can, by way of example, be placed on top on the preferably transparent spool flanges. It is also possible to fasten the braking devices to adjustable holding rails or rods and to provide adjusting scales for the braking devices on these rails or rods, adjustable in a longitudinal direction. This is represented in the embodiment shown in Fig. 8.

In Figures 2 and 3, two possibilities for the engaging of the braking devices to the sound carrier roll are represented. The braking device 6 is, according to Fig. 2, so arranged that it engages to the peripheral outer surface of the sound carrier roll 7. The device 6 can be radially shifted in the plane of the spool 7 e.g. in a guide of the plate 1 of the set and can be fixed at distances—adjustable as desired—from the centre of the sound carrier roll 7. With spools using flanges 8 and 9, the device 6 must be formed so that it can be shifted between these flanges.

Fig. 3 shows another possibility for arranging the braking device 10 which can be used with spools without flanges. Here, the braking device operates on the narrow edges of the wound-up tape 11. Here, the device 10 must thus be vertical to the plane of the tape roll and, at the same time, radially movable to it.

Fig. 4 shows another embodiment for the braking device. This is e.g. given the form of a felt disc 12 the centre of rotation of which is fitted eccentrically at 13. The strength of the felt disc must be adjusted in such a way that it can be shifted between the spool flanges. With rotation of this felt disc, the application of the braking effect can be adjusted (fine adjustment).

Fig. 5 shows schematically the principal idea of another modification of the braking device in accordance with the invention wherein the braking effect is automatically increased with increasing external diameter of the sound carrier roll. The braking shoe 14 is, in this case, designed movable in the direction of the rotary movement of the sound carrier roll 15 which is shown schematically by the roller bearing 16. When the diameter of the sound carrier roll has, during the winding up, become so large that the peripheral outer surface comes into contact with the braking shoe 14, then this is taken along by the rotating movement in the direction of the arrow and, with the continuously increasing sound carrier roll diameter, is thereby pressed tightly owing to the arising wedge effect. The spring 17 serves to draw back speedily the braking shoe 14 with reversal of the rotating direction of the sound carrier roll and thereby automatically decreases the braking effect to an extent greater than corresponds to the decrease in the diameter of the sound carrier roll.

Fig. 6 shows a further embodiment of the invention. Here the braking device is coupled with the sound pulley. Since namely in case of high speed operation, the sound pulley is lifted from the drive, it is of advantage to couple the braking device for this case automatically with the sound pulley in order to make the braking device also automatically effective with switch over to high speed. 18 and 19 are the two tape spools from which the recording tape is led past the drive roll 22 of the motor 23 and the pressure pulley 21. The braking device consists of a part 24 which unites two braking shoes in one piece and is fastened on the axle 26 and, by means of the wing-headed handle 27, is rotatable around this axle in order to be able to bring respectively one of the two braking shoes into the operative position. This rotatable braking part 24 is coupled with the sound pulley 21 by means of the heart-shaped eccentric part 25 and the angle sheet iron 28. The heart-shaped eccentric part 25 is, namely, likewise rigidly connected with axle 26 and the pressure pulley 21 is fastened, rotatably, to the angle sheet iron 28. If now the wing-headed handle 27 is turned in a clockwise direction, then the following happens: by rotation of the axle 26, the motor is switched to high speed by a switching device not shown on the diagram, in such a way that the sound carrier roll 18 rotates into the direction of the arrow; by turning of the wing-headed handle 27 further the heart-shaped eccentric part 25 is also turned in a clockwise direction so that the left projection of this part shifts the angled part 29 of the angle sheet iron 28 and thereby the latter in such a way that the pressure pulley 21 is lifted from the tape 20. Thus, the spring 30 which connects part 28 with the base plate (chassis) 31 is tensioned and with this movement part 28 is guided by the pin 32 fastened in the base plate 31. The axle 26 is also rotatably placed in the base plate 31 and is guided by an oblong hole in the angle sheet iron 28. Finally, by the rotation of 27, the braking shoe, fitted near the sound carrier roll 18, of the part 24 is brought into the operative position, i.e. is swung within the range of the sound carrier roll 18. The right braking shoe of part 24 is, by means of this movement, swung away from the range of the other spool 19. If the other sound carrier spool 18 has attained a sufficient winding diameter, so that the corresponding braking shoe of part 24 comes into contact with the peripheral outer surface of this spool, then the braking shoe is taken along further in a clockwise direction by the rotatory movement of the spool so that a braking results which becomes stronger with increasing winding up.

Thus, with the described arrangement, the braking movement can—with high speed—be coupled with the lifting of the pressure pulley and the movement of tape 20 automatically braked when a definite external diameter of the spool is reached. Further, a switch effect can, for example, be additionally released. Thus the drive of the sound carrier can be switched over or switched off e.g. by an electrical contact operated by means of the movement of the braking part 24.

Figure 7:
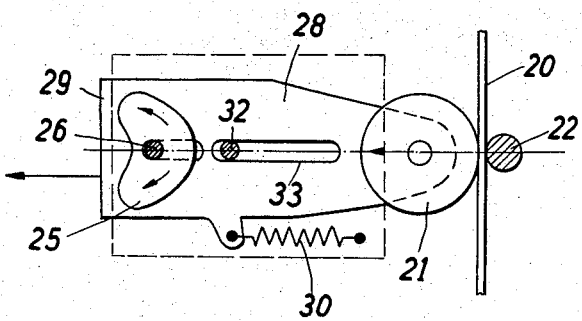
Fig. 7 is a top view of the pressure pulley mechanism.

In Fig. 7, the angle sheet iron 28 is shown once again with the essential parts. Here it can be clearly seen that the heart-shaped eccentric part 25 rests on the angled part 29 of the angle sheet iron. On the other end of the sheet iron 28, the pressure pulley 21 is placed rotatably and, with normal drive, presses the tape against the sound pulley 22. With switching over to high speed, the axle 26 is turned, at the same time the heart-shaped eccentric part 25 rotates also and shifts part 28 in the direction of the arrow with one of the two projections, resting on part 29—according to whether the axle 26 is turned to the right or the left—and thereby lifts the pressure pulley 21 from the tape 20. This movement is guided by means of pin 32 in the slit 33. By this movement, the braking part 24, rigidly coupled with part 25 and axle 26, is also brought within the range of one of the two sound carrier rolls 18 or 19 (see Fig. 6). Thus, by means of this device, the displacement of the braking device is coupled with the lifting of the sound pulley.

Figure 8:
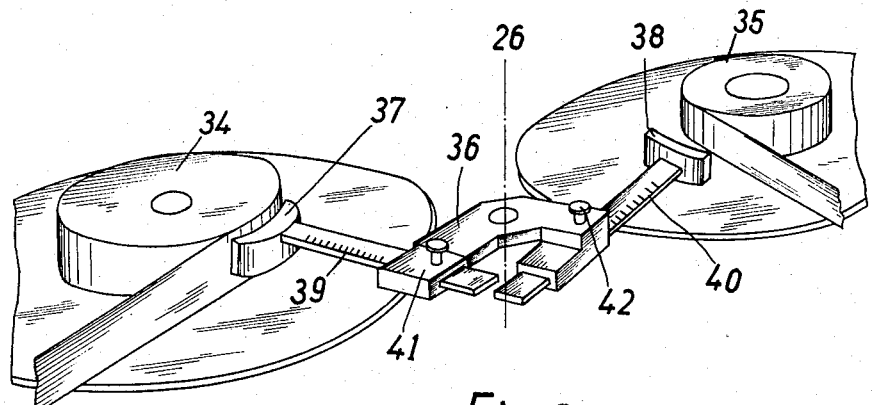
Fig. 8 is a perspective view of a further embodiment of the adjustable brake construction.

This device can now be further formed so that the operative position of the braking shoes is made adjustable. Such a model is shown by Fig. 8. Here 34 and 35 are once again the two sound carrier rolls, 36 is the rotatable braking part with the braking shoes 37 and 38. These braking shoes are now adjustable in their position with relation to the tape spool by means of the movable rods 39 and 40 which are adjustably guided in part 36 and can be fixed by means of the screws 41 and 42. The other parts, not represented for the sake of clearness could correspond to those represented in Fig. 6, however it need not necessarily be provided an automatic coupling arrangement with the pressure pulley. The adjustable rails for holding the braking shoes could be used generally for any braking device according to the principle of the invention. With this arrangement in accordance with the invention, any desired parts of the tape can be automatically sought selectively.

The adjusting scales or adjusting details can also of course, as already shown above, be placed on the e.g. transparent spool carrier.

Since the sound carrier rolls are alternately wound up, only one of the braking shoes need be put in operation at each time, that is, always only one the side of the winding-up sound carrier roll. For this reason, it is advantageous to provide two adjustment scales on each spool or on each adjusting rail for the braking shoes which make it possible to read off the adjustment for both operations.

Figure 9:
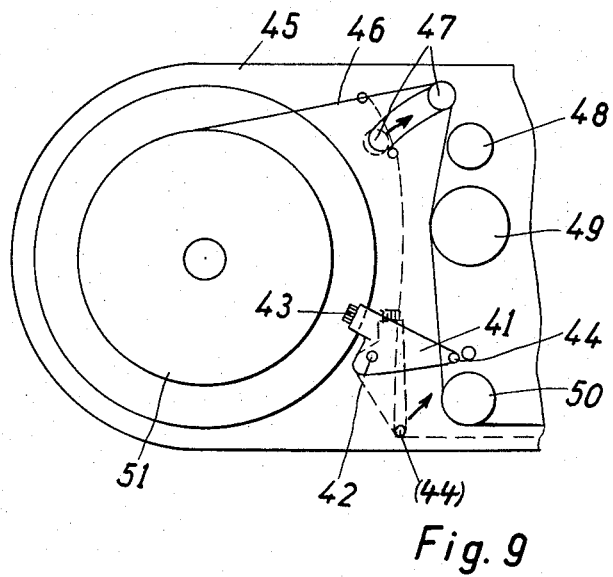
Fig. 9 is a partial top view of a tape magazine arrangement showing another modification of the braking mechanism.

Fig. 9 shows an exemplary embodiment of the invention principle e.g. for magazine use whereby the device for spreading the tape is coupled with the braking device, in accordance with the invention, in such a way that, for removal of the spool, the braking device is not in the way of or does not lie between the flanges of the tape spool. 45 is the magazine, only half of which is shown for the sake of simplification. 46 is the sound carrier tape, 47 is a part of the device for spreading the tape, which, with the insertion of the spool magazine, brings the tape into its operative position and into contact with the recording heads 48, 49 and the sound pulley 50. The position of the tape in non-operative position is shown with broken lines. The braking device 43 is coupled with and the other parts 41, 44 of the tape spreading device and rotatable around point 42. When put into operation (shown in the diagram in full lines), the braking device 43 is in operative position and within the range of the sound carrier roll 51. With switching over the tape to the non-operative position, the braking part 43 is brought into the position shown by the broken line by means of the spreading lever 41, which turns round the pivot 42 as indicated by the arrow, so that the braking shoe 43 is disengaged from the sound carrier spool 51 or comes out of its range.

To summarize, it is once again to be mentioned that it belongs to the principle of the present invention that the braking and switching effect or the device for this is to be designed, quite generally, so that it can, in dependence on the direction of rotation, be operated on only one of the two spools respectively. Such a device is already used in the exemplary embodiment of Fig. 7 specially in connection with the braking device coupled with the device for lifting the pressure pulley. In general, a switch for changing the rotatory direction can be used for this purpose which, automatically or with coupling, mechanically or electrically, brings into action the braking or switching effect only on one of the sound tape spools respectively.

What I claim is:

1. A magnetic sound tape recording apparatus comprising two sound carrier winding spools, a motor driven pulley for driving the sound carrier by selectively pressing against said sound carrier, and means for automatically controlling the sound carrier speed, said means consisting in adjustably mounted braking pieces directly arranged adjacent the winding spools' periphery in radial direction to the center of the sound carrier spools and adapted to contact the external surface of the sound carrier wound on the spools at a predetermined winding spool diameter, and consisting of elastic material.

2. A magnetic sound tape recording apparatus comprising two sound carrier winding spools, a motor driven pulley for driving the sound carrier by selectively pressing against said sound carrier, and means for automatically controlling the sound carrier speed, said means consisting in adjustably mounted braking pieces directly arranged adjacent the winding spools' periphery in radial direction to the center of the sound carrier spools and adapted to contact the external surface of the sound carrier wound on the spools at a predetermined winding spool diameter, and consisting of elastic material, and being further provided with springs which are located as to be effective by their pressure action in opposite direction to the direction of the increasing diameter of said spools.

3. A magnetic sound tape recording apparatus comprising two sound carrier winding spools, a motor driven pulley for driving the sound carrier by selectively pressing against said sound carrier, and means for automatically controlling the sound carrier speed, said means consisting in adjustably mounted braking pieces directly arranged adjacent the winding spools' periphery in radial direction to the center of the sound carrier spools and adapted to contact the external surface of the sound carrier wound on the spools at a predetermined winding spool diameter, and consisting of elastic material and being further formed as eccentrically and rotatably mounted flat discs.

4. A magnetic sound tape recording apparatus comprising two sound carrier winding spools, a motor driven pulley for driving the sound carrier by selectively pressing against said sound carrier, means for automatically controlling the sound carrier speed, an axis for this means, and a handle for operating said means, said means consisting in adjustably mounted braking pieces directly arranged adjacent the winding spools' periphery in radial direction to the center of the sound carrier spools and adapted to contact the external surfaces of the sound carrier wound on the spools, said means further forming two braking shoes in one piece, each of which is arranged directly adjacent one of said winding spools, and mounted on said axis which is rotatable by said handle to enable either of said two braking shoes to cooperate with the external surface of said sound carrier wound on the spools.

5. A magnetic sound tape recording apparatus comprising two sound carrier winding spools, a motor driven pulley for driving the sound carrier by selectively pressing against said sound carrier, means for automatically controlling the sound carrier speed, an axis for this means, and a handle for operating said means, further a heart-shaped eccentric piece and an angle-sheet piece, said means consisting in adjustably mounted braking pieces directly arranged adjacent the winding spools' periphery in radial direction to the center of the sound carrier spools and adapted to contact the external surface of the sound carrier wound on the spools at a predetermined winding spool diameter, said means further forming two braking shoes in one piece, each of which is arranged directly adjacent one of said winding spools, and mounted on said axis which is rotatable by said handle to enable either of said braking shoes to cooperate with the external surface of one of said sound carrier winding spools, and being further mechanically coupled with said motor driven pulley by means of said heart-shaped eccentric piece which is equally mounted on said axis and thus rotatable together with said axis and said means, thus being adapted to make inoperative said means as soon as said drive pulley is in contact with the sound tape and to make operative said means as soon as said drive pulley is lifted from said sound tape.

6. A magnetic sound tape recording apparatus comprising two sound carrier winding spools, a motor driven pulley for driving the sound carrier by selectively pressing against said sound carrier, means for automatically controlling the sound carrier speed, an axis for this means, a handle for operating said means, and two adjustably guided rods, said means consisting in adjustably mounted braking pieces directly arranged adjacent the winding spools' periphery in radial direction to the center of the sound carrier spools and adapted to contact the external surfaces of the sound carrier wound on the spools, said means further forming two separate braking shoes affixed to the end of said adjustably guided rods carrying on their surface marks for precisely setting said braking shoes with reference to the diameter of said sound carrier winding spools, said means further being mounted on said axis which is rotatable by said handle to enable either of said two braking shoes to cooperate with the external surface of said sound carrier wound on the spools.

7. A magnetic sound tape recording apparatus comprising two sound carrier winding spools, a motor driven pulley for driving the sound carrier by selectively pressing against said sound carrier, and means for automatically controlling the sound carrier speed, said means consisting in adjustably mounted braking pieces directly arranged adjacent the winding spools' periphery in radial direction to the center of the sound carrier spools and adapted to contact the external surface of the sound carrier wound on the spools at a predetermined winding spool diameter.

8. A magnetic sound tape recording apparatus comprising two sound carrier winding spools, a motor driven pulley for driving the sound carrier by selectively pressing against said sound carrier, means for automatically controlling the sound carrier speed, a magazine casing for enclosing the sound carrier winding spools, and a spreading device within said magazine for bringing the tape in operative condition when said cassette casing is inserted into the recording apparatus, said means consisting of adjustably mounted braking pieces directly arranged adjacent the winding spools' periphery in radial direction to the center of the sound carrier spools and adapted to contact the external surface of the sound carrier wound on the spools at a predetermined winding spool diameter, said means being further rotatably arranged within said magazine casing and coupled to said spreading device within said magazine, thus being adapted to be brought into operative condition for braking the tape winding spool after the tape has been brought into operative position.

References Cited in the file of this patent

UNITED STATES PATENTS

| | | |
|---|---|---|
| 2,468,198 | Heller | Apr. 26, 1949 |
| 2,557,185 | Gibbs | June 19, 1951 |
| 2,687,259 | Owens | Aug. 24, 1954 |

FOREIGN PATENTS

| | | |
|---|---|---|
| 811,042 | Germany | Aug. 16, 1951 |